United States Patent
Krantz et al.

(10) Patent No.: US 8,943,560 B2
(45) Date of Patent: Jan. 27, 2015

(54) TECHNIQUES TO PROVISION AND MANAGE A DIGITAL TELEPHONE TO AUTHENTICATE WITH A NETWORK

(75) Inventors: Anton Krantz, Kirkland, WA (US); Rajesh Ramanathan, Redmond, WA (US); Adrian Potra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 12/127,828

(22) Filed: May 28, 2008

(65) Prior Publication Data

US 2009/0296930 A1 Dec. 3, 2009

(51) Int. Cl.
*H04L 29/06* (2006.01)
*H04L 9/32* (2006.01)
*G06F 21/31* (2013.01)

(52) U.S. Cl.
CPC ............... *H04L 9/32* (2013.01); *H04L 63/083* (2013.01); *H04L 63/0815* (2013.01);
(Continued)

(58) Field of Classification Search
CPC . H04L 9/32; H04L 63/0853; H04L 29/06027; H04L 63/08; H04L 63/083; H04L 63/0815; H04L 63/0823; H04Q 2213/13095; G06F 21/31
USPC .......................................................... 726/5
See application file for complete search history.

(56) References Cited

U.S. PATENT DOCUMENTS 6,195,542 B1 2/2001 Griffith
6,616,035 B2 9/2003 Ehrensvard et al.
(Continued)

FOREIGN PATENT DOCUMENTS

JP HEI11-149451 6/1999
JP 2003-51818 2/2003
(Continued)

OTHER PUBLICATIONS

Hallsteinsen, Steffen, Do Van Thanh, and Ivar Jorstad. "Using the Mobile Phone as Security Token for Unified Authentication." Second International Conference on Systems and Networks Communications, 2007. ICSNC 2007.*
(Continued)

*Primary Examiner* — Taghi Arani
*Assistant Examiner* — Narciso Victoria
(74) *Attorney, Agent, or Firm* — Andrew Smith; Brian Haslam; Micky Minhas

(57) ABSTRACT

Techniques to manage digital telephones are described. An apparatus may comprise a digital telephone management component having a telephone interface module operative to receive security information in the form of a personal identification number (PIN) for an operator or device. The digital telephone management component may also comprise a telephone security module communicatively coupled to the telephone interface module, the telephone security module operative to receive encrypted security credentials from a computing device, and decrypt the encrypted security credentials with the PIN. The digital telephone management component may further comprise a telephone authentication module communicatively coupled to the telephone security module, the telephone authentication module operative to authenticate the digital telephone using the security credentials. Other embodiments are described and claimed.

20 Claims, 7 Drawing Sheets

(52) U.S. Cl.
CPC ............... *G06F 21/31* (2013.01); *H04L 63/08* (2013.01); *H04L 63/0823* (2013.01); *H04L 63/0853* (2013.01); *H04L 9/3226* (2013.01); *H04Q 2213/13095* (2013.01)
USPC .................................. 726/5; 726/17; 713/182

(56) References Cited

U.S. PATENT DOCUMENTS

| | | | |
|---|---|---|---|
| 6,958,992 | B2 | 10/2005 | Lee et al. |
| 7,190,948 | B2 | 3/2007 | Donley et al. |
| 7,260,221 | B1 | 8/2007 | Atsmon |
| 7,308,431 | B2 | 12/2007 | Asokan et al. |
| 7,735,120 | B2 * | 6/2010 | Wallace et al. ................... 726/5 |
| 2004/0250083 | A1 * | 12/2004 | Schwab ....................... 713/182 |
| 2005/0081044 | A1 * | 4/2005 | Giles et al. .................... 713/182 |
| 2005/0210252 | A1 * | 9/2005 | Freeman et al. .............. 713/171 |
| 2006/0046710 | A1 | 3/2006 | Lohlein et al. |
| 2006/0143465 | A1 | 6/2006 | Lai et al. |
| 2006/0218396 | A1 * | 9/2006 | Laitinen et al. ............... 713/167 |
| 2006/0230112 | A1 | 10/2006 | Henderson et al. |
| 2007/0064918 | A1 | 3/2007 | Son |
| 2007/0067835 | A1 | 3/2007 | Koistinen et al. |
| 2007/0286376 | A1 | 12/2007 | Maximo et al. |
| 2008/0075064 | A1 | 3/2008 | Krantz et al. |
| 2010/0130164 | A1 | 5/2010 | Chowdhury et al. |

FOREIGN PATENT DOCUMENTS

| | | |
|---|---|---|
| JP | 2005-110129 A | 4/2005 |
| JP | 2006-352225 | 12/2006 |
| JP | 2007-110351 | 4/2007 |
| JP | 2008-506139 | 2/2008 |
| JP | 2009-538478 | 11/2009 |
| WO | 0106805 A1 | 1/2001 |
| WO | 07136277 A1 | 11/2007 |
| WO | 2007136277 A1 | 11/2007 |

OTHER PUBLICATIONS

International Search Report for PCT Application No. PCT/US2009/040918 mailed on Nov. 24, 2009, 2 pages.
"LockItNow! 1.2", http://www.freetrialsoft.com/LockItNow-review-26031.html.
"Mobile Phones: Mobile Phone Unlocking", http://www.celtnet.org.uk/mobile-phone/mobile-phone-locking.html.
Office Action received for Japanese patent Application No. 2011-511674, mailed Jun. 11, 2013, 8 pages, including 4 pages English translation.
Tadashi, Shiga, "Solution Operation/This is the Point! Third installments, Utilization of Electronic Certificate—Acquisition and Point in Daily Operation," N+I Network, vol. 3, No. 2, pp. 118 to 123, Softbank Publishing Inc., Japan, Feb. 1, 2003.
Search Report received for Taiwanese Patent Application No. 098110723, mailed Dec. 20, 2013, 1 pg.
"LockItNow! 1.2", http://www.freetrialsoft.com/LockItNow-review-26031.html Mar. 10, 2008.
"Mobile Phones: Mobile Phone Unlocking", http://www.celtnet.org.uk/mobile-phone/mobile-phone-locking.html Mar. 10, 2008.

* cited by examiner

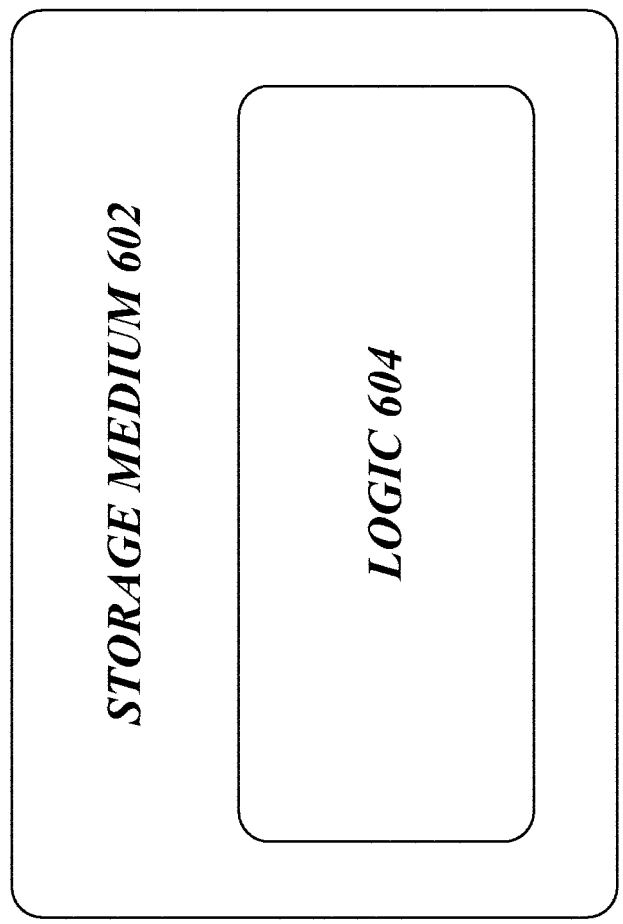

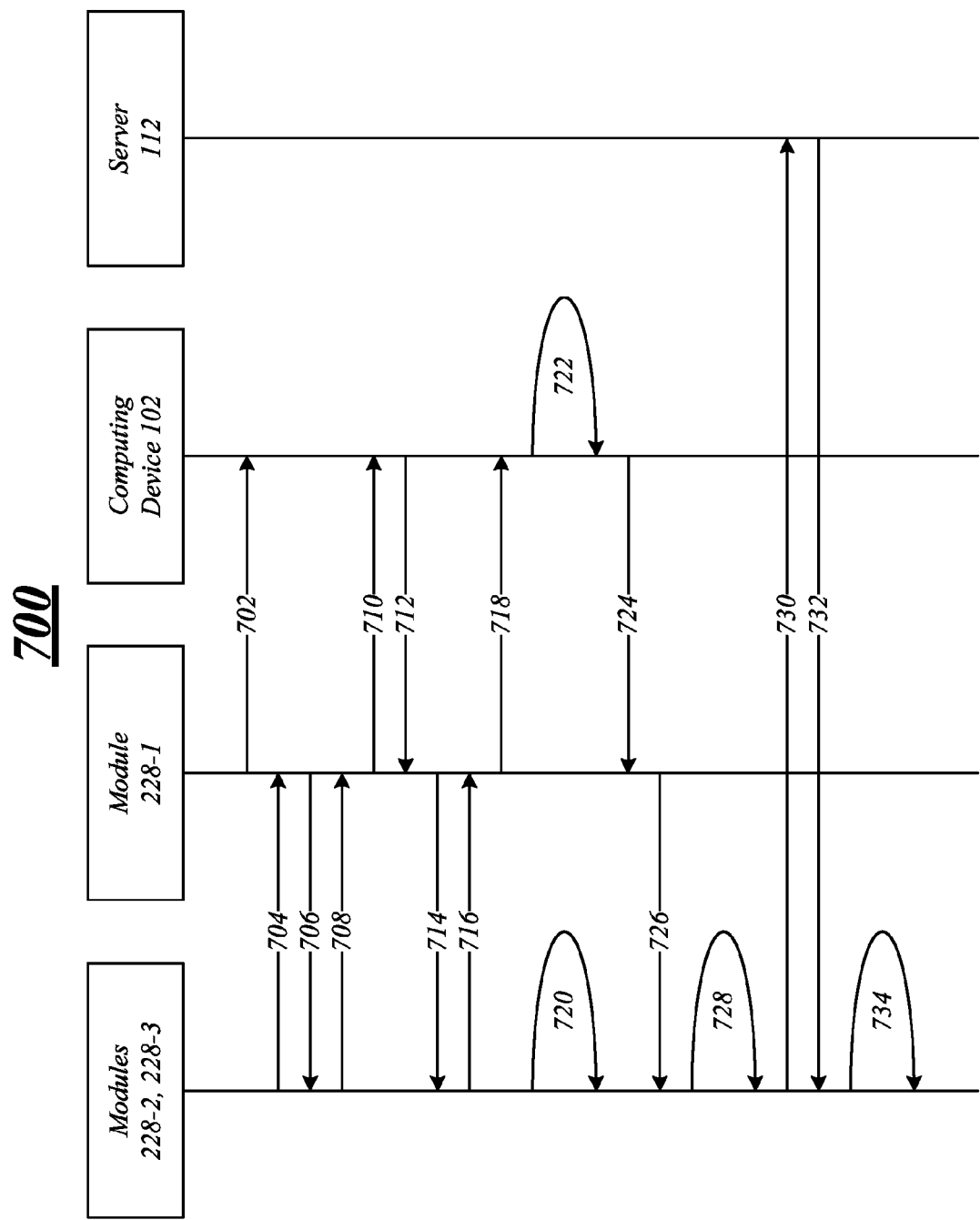

TECHNIQUES TO PROVISION AND MANAGE A DIGITAL TELEPHONE TO AUTHENTICATE WITH A NETWORK

BACKGROUND

Unified communications (UC) is a commonly used term for the integration of disparate communications network, media, devices and applications. This potentially includes the integration of fixed and mobile voice, electronic mail, instant messaging, desktop and advanced business applications, Internet Protocol (IP)-PBX, voice over IP (VoIP), presence, voice-mail, fax, audio video and web conferencing, unified messaging, unified voicemail, and whiteboarding into a single environment offering the user a more complete and seamless communication solution, thereby providing a more effective and simplified experience.

The convenience offered by combining these disparate communications techniques into a single UC framework, however, also heightens the associated security risks. If a single UC device is compromised, then the entire UC framework may be exposed as well. Consequently, authentication techniques are typically implemented to enhance security for UC systems. Such authentication techniques, however, typically require some form of security credentials to be present on the UC device. Installing security credentials on some UC devices may be cumbersome, particularly when UC device has limited forms of input devices, such as a keypad on a digital telephone.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to communications networks. Some embodiments are particularly directed to techniques to manage various communications devices within a communications network having one or more elements of a UC framework. In one embodiment, for example, a communications network may include a digital telephone and a computing device, with both devices interoperable with each other and a communications server. The digital telephone may include a digital telephone management digital telephone management subsystem, which includes a digital telephone management component. The digital telephone management component may be operative to manage certain operations of the digital telephone.

The digital telephone management component may comprise, among other elements, a telephone interface module operative to receive security information in the form of a personal identification number (PIN) for an operator or device. The digital telephone management component may also comprise a telephone security module communicatively coupled to the telephone interface module, the telephone security module operative to receive encrypted security credentials from a computing device, and decrypt the encrypted security credentials with the PIN. The digital telephone management component may further comprise a telephone authentication module communicatively coupled to the telephone security module, the telephone authentication module operative to authenticate the digital telephone using the security credentials. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of an article.
FIG. 7 illustrates one embodiment of a message flow diagram.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to digital telephone management techniques. Some embodiments are particularly directed to digital telephone management techniques for a computing device to manage a digital telephone suitable for use with a packet network and UC system. In one embodiment, a computing device may include a provisioning and control subsystem arranged to provision and control a communications device, such as a digital telephone. For example, the provisioning and control subsystem may provision the digital telephone with security information such as security credentials. The security credentials may be used to authenticate the digital telephone with a network, such as a UC server. In another example, the provisioning and control subsystem may control certain security operations for the digital telephone, such as placing the digital telephone in a locked or unlocked mode. This may be accomplished directly be communicating control directives to the digital telephone, or indirectly by using presence information for the digital telephone. Additionally or alternatively, the digital telephone may control certain security operations for the computing device using similar techniques. As a result, the embodiments can improve affordability, scalability, modularity, extendibility, or interoperability for an operator, device or network.

Figure 1:
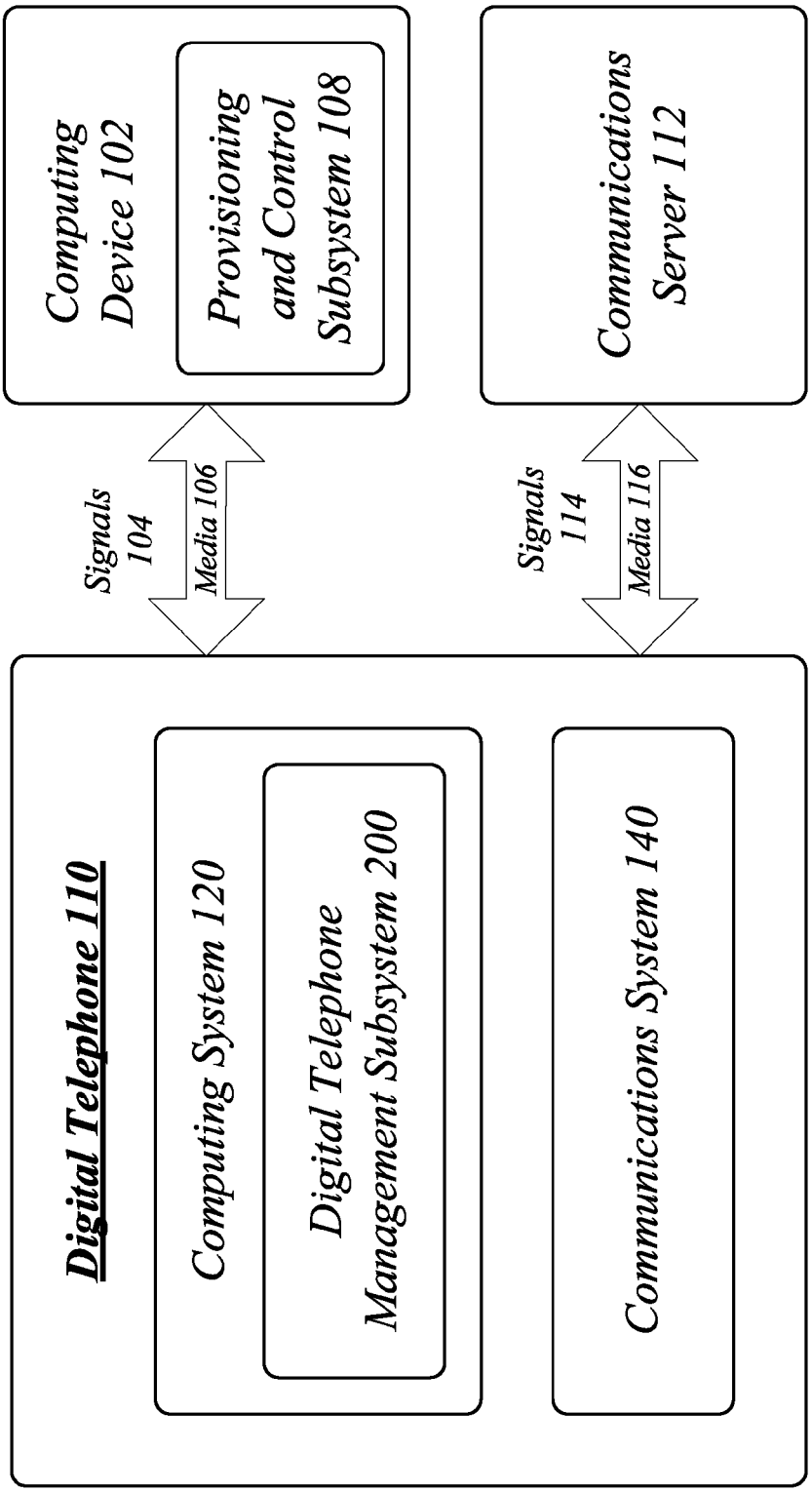
FIG. 1 illustrates an embodiment of a first network.

FIG. 1 illustrates a block diagram for a communications network 100. The communications network 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the communications network 100 may comprise, among other elements, a computing device 102, a digital telephone 110, and a communications server 112. Although the communications network 100 as shown in FIG. 1 has a limited number of elements in a certain topology, it may be appreciated that the communications network 100 may include more or less elements in alternate topologies as desired for a given implementation.

In general, the network devices and infrastructure equipment implemented for the communications network 100 may implement various communications techniques to establish communications channels and communications sessions for multimedia communications between various communications devices. In one embodiment, for example, the network 110 may implement various VoIP technologies for voice communications over a network. The network may comprise a packet-switched network, or a combination of a packet-switched network and a circuit-switched network.

A specific implementation for the network devices and infrastructure equipment implemented for the network 110 may vary depending upon a desired set of communication protocols or standards. In one example, the communications network 100 may implement communication protocols or standards defined in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the communications network 100 may implement communication protocols or standards defined in accordance with the International Telecommunication Union (ITU) H.323 series of standards and/or variants. Both the SIP and H.323 standards are signaling protocols for VoIP or Voice Over Packet (VOP) multimedia call operations. It may be appreciated that other signaling protocols may be implemented for the communications network 100, however, and still fall within the scope of the embodiments.

In general operation, the communications network 100 may be used for VoIP calls. VoIP calls typically involve communicating voice and/or data information between multiple end points. For example, a public or private packet network may be used for voice communications, audio conferencing calls, and so forth. Although designed for packet-switched information, the communications network 100 may also be connected to a Public Switched Telephone Network (PSTN) via one or more suitable VoIP gateways arranged to convert between circuit-switched information and packet-switched information.

Referring again to FIG. 1, the computing device 102 may generally comprise any electronic device designed for managing, processing or communicating information in the communications network 100. Examples for the computing device 102 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. In one embodiment, for example, the computing device 102 may comprise a desktop computer suitable for a home or office environment. Further, the computing device 102 may have communications capabilities, including various wired or wireless communications interfaces and appropriate communications software. In one embodiment, for example, the computing device 102 may implement client-based communications software such as the MICROSOFT® OFFICE COMMUNICATOR, made by Microsoft Corporation, Redmond, Wash.

The communications server 112 may generally comprise any electronic device designed for managing, processing or communicating information in the communications network 100. Examples for the communications server 112 may include without limitation those examples given for the computing device 102. In one embodiment, for example, the communications server 112 may comprise a UC server. A UC server is designed to provide UC network services for a real-time delivery of communications using heterogeneous communications techniques based on a prioritized method and location of the recipient. The communications techniques may include any type of communications technique or mechanism, including without limitation instant messaging, group chat, telephony, video, email, voicemail, short message services, multimedia message services, and so forth. In one embodiment, the communications server 112 may be implemented as a MICROSOFT OFFICE COMMUNICATIONS SERVER made by Microsoft Corporation, Redmond, Wash. It may be appreciated, however, that implementations are not limited to this example.

The digital telephone 110 may comprise any type of digital telephony device suitable for communicating digital signals, such as digital voice signals, over a packet network. The digital telephone 110 may comprise a wired or wireless electronic device, and is typically a consumer electronic appliance having limited input devices such as a microphone, keypad and optional function keys, and limited output devices such as a relatively small digital display, light emitting diodes, and a speaker. Examples for the digital telephone 110 may include without limitation a telephone, a packet telephone, a VoIP telephone, an Internet Protocol (IP) telephone, an Internet telephone, and so forth. In one embodiment, for example, the digital telephone 110 may comprise a wired VoIP telephone suitable for a desktop in a home or office environment. Furthermore, the computing device 102 may have communications capabilities, including various wired or wireless communications interfaces and appropriate communications software. In one embodiment, for example, the digital telephone 110 may implement client-based communications software designed for VoIP telephones such as the MICROSOFT OFFICE COMMUNICATOR PHONE EDITION, made by Microsoft Corporation, Redmond, Wash.

The digital telephone 110 may be communicatively coupled to the computing device 102 and the communications server 112 via respective communications media 106, 116. The communications media 106, 116 may be used to coordinate operations between the respective devices. The coordination may involve the unidirectional or bi-directional exchange of information. For instance, the computing device 102 and the communications server 112 may communicate information with the digital telephone 110 in the form of respective signals 104, 114 communicated over the respective communications media 106, 116. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The communications media 106, 116 may be used for establishing various communication channels between the various elements of network 100, including the computing device 102, the digital telephone 110, the communications server 112, and other network devices. In one embodiment, for example, the communications media 106, 116 may be used to establish various signaling channels, connections or communications paths suitable for communicating control information. Control information may refer to any data representing commands, instructions or control words meant for an automated system. For example, control information may be used to route media information through a system, or instruct a node to process the media information in a predetermined manner. In one embodiment, for example, the communications media 106, 116 may be used to establish various media channels, connections or communications paths suitable for communicating media information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. The communication channels are typically secure communication channels in order to prevent snooping from unauthorized parties, although in some cases unsecure communication channels may be used as well.

In various embodiments, the computing device 102 and the digital telephone 110 are typically owned by a single human operator, and are therefore considered to be a trusted pair. As such, the computing device 102 may share security credentials with the digital telephone 110, and vice-versa, since the security credentials are used to verify the identity of the single owner. Since the computing device 102 and the digital telephone 110 are a trusted pair, the computing device 102 and the digital telephone 110 may coordinate operations between each other to increase services and convenience to the owner. For example, the computing device 102 may provision the digital telephone 110 with security credentials for use with the communications server 112, thereby reducing or eliminating the need for the operator to enter the security credentials into the digital telephone directly using the limited input devices of the digital telephone 110. Furthermore, the computing device 102 and the digital telephone 110 may synchronize operational states, such as locked or unlocked, to reduce or eliminate the need for the operator to lock or unlock each device separately. For the most part, the provisioning operations are automatic, with the exception that a human operator could enter a common and limited form of security information into both devices, such as a unique PIN assigned to the operator, thereby providing an additional level of security for both devices.

The computing device 102, the digital telephone 110 and the communications server 112 may communicate media information and control information utilizing various media connections established for a given call session. The media connections may be established using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Quality-of-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the various devices of the communications network 100 may use SIP as a signaling channel to setup the media connections, and RTP as a media channel to transport media information over the media connections.

In various embodiments, the computing device 102 and/or the digital telephone 110 may include logic to implement various enhanced digital telephone management techniques. The logic may be implemented using hardware elements, software elements, or a combination of hardware elements and software elements. Furthermore, the logic implemented for each device may be designed to interoperate with each other and the communications server 112 to facilitate the desired operations for each device.

In the illustrated embodiment shown in FIG. 1, the computing device 102 may include a provisioning and control subsystem 108. The provisioning and control subsystem 108 may be arranged to provision and control the digital telephone 110 for network operations. For example, the provisioning and control subsystem 108 may provision the digital telephone 110 with security information such as security credentials.

A security credential is a form of digital credential meant to be the digital equivalent of paper based credentials. Just as an example a paper based credential could be a passport, a Driver's license, a membership certificate or some kind of ticket to obtain some service, like a cinema ticket or a public transport ticket. A credential is a proof of qualification, competence, or clearance that is attached to a person. Similarly digital credentials prove something about their owner. Both may contain personal information such as the persons name, birthplace, and birthdate, or biometric information such as a picture or a finger print. In operation security credentials are the properties of a process that are used to determine access rights for a human operator, a computer program, a hardware device, an object, an entity, and so forth. Examples of security credentials include without limitation a user identifier (UID), PIN, a password, a domain user name, a domain name, digital certificates, key material or information, cryptographic information, and so forth. The embodiments are not limited in this context.

The digital telephone 110 may use the security credentials to authenticate the digital telephone 110 with a network device, such as the communications server 112. In another example, the provisioning and control subsystem may 104 may control certain security operations for the digital telephone 110, such as placing the digital telephone 110 in a locked or unlocked mode. A locked mode may refer to rendering the digital telephone 110 inoperable or inaccessible to an operator or another device. An unlocked mode may refer to rendering the digital telephone 110 operable or accessible to an operator or another device. This may be accomplished directly by having the provisioning and control subsystem 108 communicate control directives to the digital telephone 110, or indirectly by using presence information for the digital telephone 110.

The digital telephone 110 may comprise a computing system 120 and/or a communications system 140. The computing system 120 includes various common computing elements, such as one or more processors, co-processors, memory units, chipsets, controllers, peripherals, interfaces, oscillators, timing devices, video cards, audio cards, multimedia input/output (I/O) components, and so forth. The communications system 140 includes various common communications elements, such as a transmitter, receiver, transceiver, radio, network interface, baseband processor, antenna, amplifiers, filters, and so forth. In one embodiment, for example, the digital telephone 110 may be implemented using a computing and communications architecture as described with reference to FIG. 5.

The computing system 120 and/or the communications system 140 may include a digital telephone management subsystem 200. The digital telephone management subsystem 200 may implement various digital telephone management techniques for the digital telephone 110. In one embodiment, for example, the digital telephone management subsystem 200 may receive the signals 104 from the computing device 102 over the communications media 106. The signals 104 may comprise messages from the provisioning and control subsystem 108 to coordinate security operations for the digital telephone 110. In one embodiment, for example, the digital telephone management subsystem 200 may send the signals 114 to a network device, such as the communications server 112. The signal 114 may comprise messages from the digital telephone management subsystem 200, or relayed messages from the computing device 102, to perform security operations needed by the communications server 112. The client-server security operations may include without limitation registration, authentication and authorization operations for accessing UC technologies provided by the communications server 112.

In various embodiments, the digital telephone management subsystem 200 may be arranged to manage various security operations for the digital telephone 110. In one embodiment, for example, the digital telephone management subsystem 200 may manage authentication operations for authenticating the digital telephone 110 with a network device, such as the communications server 112.

Generally, authentication refers to the act of establishing or confirming something (or someone) as authentic, that is, that claims made by or about the thing are true. Authenticating an object may mean confirming its provenance, whereas authenticating a person often consists of verifying their identity. Authentication depends upon one or more authentication factors. In terms of computer or electronic security, authentication operations attempt to verify the digital identity of a sender of a communication such as a request to log in to a network device. The sender being authenticated, often referred to as the principal, may be a person using a computer, a computer itself or a computer program. A blind credential, in contrast, does not establish identity at all, but only a narrow right or status of the user or program.

In one embodiment, the digital telephone management subsystem 200 may manage provisioning the digital telephone 110 with proper security credentials in order to perform authentication operations on behalf of the digital telephone 110, or operator of the digital telephone 110, as requested by the communications server 112. For example, the digital telephone management subsystem 200 may receive encrypted security credentials from the provisioning and control subsystem 108 of the computing device 102, decrypt the security credentials, and use the security credentials to authenticate the digital telephone 110 with the communications server 112.

Additionally or alternatively, the digital telephone management subsystem 200 may manage certain operational states for the digital telephone 110 and/or the computing device 102. In one embodiment, the digital telephone management subsystem 200 may receive and process control directives from the provisioning and control subsystem 108, and control certain operations for the digital telephone 110 according to the received control directives. For example, the computing device 102 may place the digital telephone 110 in a locked state or unlocked state, in some cases corresponding to a locked state or unlocked states for the computing device 102. In one embodiment, the digital telephone management subsystem 200 may send control directives to the provisioning and control subsystem 108, where the provisioning and control subsystem 108 can receive and process the control directives to control certain operations for the computing device 102. For example, the digital telephone 110 may place the computing device 102 in a locked state or unlocked state, in some cases corresponding to a locked state or unlocked states for the digital telephone 110. Control directives may be exchanged for other security operations as well.

Figure 2:
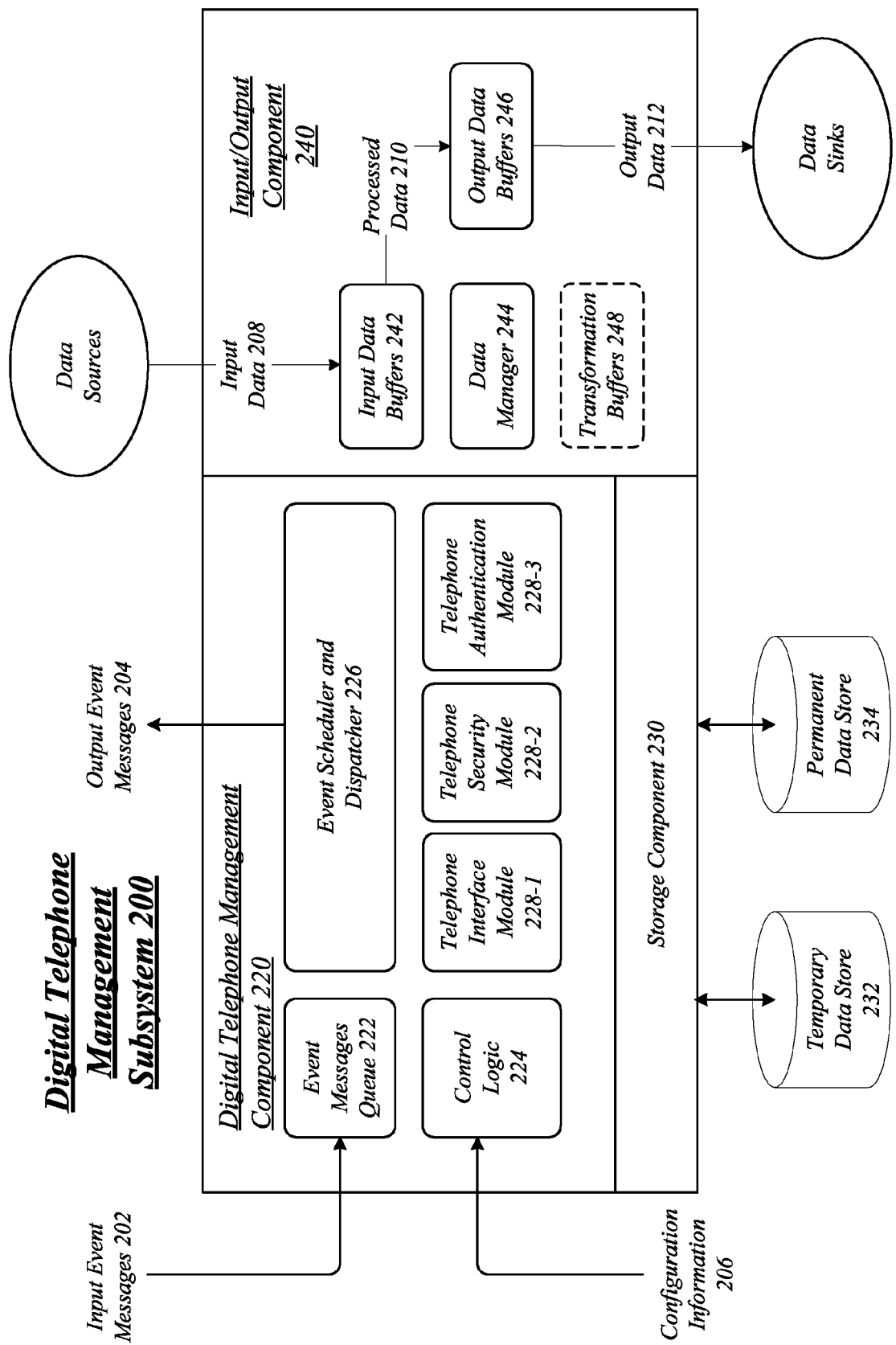
FIG. 2 illustrates an embodiment of a subsystem.

FIG. 2 illustrates a more detailed block diagram for the digital telephone management subsystem 200. The digital telephone management subsystem 200 may comprise multiple components and/or modules. In the illustrated embodiment shown in FIG. 2, the digital telephone management subsystem 200 may include a digital telephone management component 220, a storage component 230, and an input/output (I/O) component 240. The components and/or modules may be implemented using hardware elements, software elements, or a combination of hardware elements and software elements. Although the digital telephone management subsystem 200 as shown in FIG. 2 has a limited number of elements in a certain topology, it may be appreciated that the digital telephone management subsystem 200 may include more or less elements in alternate topologies as desired for a given implementation.

A digital telephone management component 220 may be arranged to receive various input event messages 202 at an event message queue 222. The event message queue 222 may comprise one or more queues for handling event messages. In one embodiment, for example, the event message queue 222 may handle event messages with distinct priorities. The input event messages 202 may include various event messages from the computing device 102 or the communications server 112. Examples of input event messages 202 from the computing device 102 may include without limitation status checks for operational states of the computing device 102, requests for status checks for the operational states of the digital telephone 110, security credentials from the provisioning and control subsystem 108, control directives from the provisioning and control subsystem 108 to lock and unlock the digital telephone 110, messages and information intended for relay by the digital telephone 110 to the communications server 112, and so forth. Examples of input event messages 202 from the communications server 112 may include without limitation requests for registration information, requests for authentication information, requests for capabilities information, network access timeout messages, messages and information intended for relay by the digital telephone to the computing device 102, and so forth. The embodiments are not limited in this context.

The digital telephone management component 220 may include control logic 224. The control logic 224 may be arranged to control operations of the digital telephone management component 220 based on configuration information 206. For example, the control logic 224 may execute an algorithm, logic flow or a state machine to perform various operations on the input data 208 in response to the various input event messages 202. The control logic 224 may process the input data 208 based on the configuration information 206 to form processed data 210. The control logic 224 may also generate various output event messages 204, and send the output event messages 204 to an event scheduler and dispatcher 226.

The digital telephone management component 220 may include an event scheduler and dispatcher 226. The event scheduler and dispatcher 226 may be arranged to initiate events to other external entities, and dispatches internal events and messages within the digital telephone management component 220. For example, the event scheduler and dispatcher 226 to send various output event messages 204 responsive to the input event messages 202 to other systems, subsystems, components or modules for the computing device 102, the communications server 112, the digital telephone 110, and/or the communications network 100. The output event messages 204 may include various event messages to the computing device 102 or the communications server 112. Examples of output event messages 204 to the computing device 102 may include without limitation status checks for operational states of the digital telephone 110, requests for status checks for operational states of the computing device 102, requests for security credentials from the provisioning and control subsystem 108, control directives to the provisioning and control subsystem 108 to lock and unlock the computing device 102, messages and information received from the communications server 112 for relay to the computing device 102, and so forth. Examples of output event messages 204 to the communications server 112 may include without limitation registration information, authentication information, capabilities information, messages and information received from the computing device 102 for relay to the communications server 112, and so forth. The embodiments are not limited in this context.

In one embodiment, the digital telephone management subsystem 200 may include the storage component 230. The storage component 230 may be arranged with data stores and logic to manage storage operations for the digital telephone management component 220. The storage component 230 may store temporary or non-transacted information used by the digital telephone management component 220 in a temporary data store 232. For example, the temporary or non-transacted information may be stored as extensible markup language (XML), binary files, or some other format in the temporary data store 232. The storage component 230 may store persistent or transacted information used by the digital telephone management component 220 in a permanent data store 234. The data stores 232, 234 may comprise individual data stores, respectively, or multiple data stores comprising part of a larger data store array, such as a storage area network (SAN). Furthermore, the storage component 230 and the data stores 232, 234 may implement the appropriate data buffering and caching techniques and structures if needed to meet system latency and capacity parameters. The storage component 230 also manages operations for logging and auditing storage.

In one embodiment, the storage component 230 may temporarily or permanently store security credentials used to authenticate the digital telephone with the communication server 112. The storage component 230 may store the security credentials as encrypted security credentials or decrypted security credentials depending on the operational state of the digital telephone 110, and/or other security considerations. The storage component 230 may store the security credentials for a currently received authentication requests from the communications server 112, such as real-time authentication requests. In some cases, the storage component 230 may store the security credentials in anticipation of subsequent or future authentication requests from the communications server 112, such as non-real-time authentication requests.

In one embodiment, the digital telephone management subsystem 200 may include the I/O component 240. The I/O component 240 may be arranged with buffers and logic to manage transport and I/O operations in moving information throughout the digital telephone management subsystem 200. For example, the I/O component 240 may include one or more input data buffers 242 to receive and store input data 208 from an input subsystem. Examples of the input data 208 may include without limitation encrypted security credentials received from the provisioning and control subsystem 108. One or more modules of the digital telephone management component 220 may process the input data 208 to form processed data 210, and send it to one or more output data buffers 246. Examples of the processed data 210 may include without limitation decrypted security credentials. The output data buffers 246 may be arranged to store and send output data 212 to an output subsystem. A data manager 244 may implement logic and network interfaces (e.g., web service interfaces) to control and manage data collection services and data distribution services. Optionally, the I/O component 240 may implement one or more transformation buffers 248 to transform the input data 208 and/or the processed data 210 from one format, data schema or protocol, to alternate formats, data schemas, or protocols.

In general operation, the digital telephone management subsystem 200 may be arranged to implement various enhanced digital telephone management techniques. This may be accomplished using a number of telephone modules 228-1-*p*. In the illustrated embodiment shown in FIG. 2, the telephone modules 228-1-*p* may include a telephone interface module 228-1, a telephone security module 228-2, and a telephone authentication module 228-3. Although a specific number of telephone modules 228-1-*p* are shown in FIG. 2 by way of example and not limitation, it may be appreciated that more or less modules may be implemented for various sets of digital telephone management operations as desired for a given implementation. The embodiments are not limited in this context.

The telephone interface module 228-1 may be generally operative to manage, control, process and otherwise perform interface operations for the digital telephone 110. In one embodiment, for example, the telephone interface module 228-1 may provide user interface (UI) elements or graphic user interface (GUI) elements for displaying information to an operator of the digital telephone 110. The telephone interface module 228-1 may also receive operator input and commands for the digital telephone 110.

The telephone interface module 228-1 may further be specifically designed to interface with the provisioning and control subsystem 108 of the computing device 102. For example, the telephone interface module 228-1 may be designed to exchange capabilities and status information with the provisioning and control subsystem 108. Examples of status information may include determining an operational state for the computing device 102 and/or the digital telephone 110, such as active, inactive, varying sleep modes, locked, unlocked, and so forth.

The telephone interface module 228-1 may be arranged to receive security information from an operator. The operator security information may comprise any information that is suitable for authenticating an operator. Ideally, the security information could be unique and secret, in other words, known only to the operator. For purposes of authentication, since the security information is unique and known only to the operator, when the security information is provided by an operator there is an implicit assumption that the operator entering the security information is the same operator associated with the security information as stored in an operator profile. In one embodiment, the security information may comprise a PIN. A PIN is a common example of security information. The PIN may comprise a specific sequence of alphanumeric text or symbols. The security information may be received from the operator in various modalities using various input device, such as a keypad for typed information, a microphone for audible or spoken information, a video camera for image information, a biometric device for biometric information (e.g., retinal scans, fingerprints, facial recognition, etc.), and so forth. Although a PIN is used as an example, any symmetric or asymmetric security technique may be used for the digital telephone 110 and the computing device 102 as desired for a given implementation.

The telephone security module 228-2 may be communicatively coupled to the telephone interface module 228-1. The telephone security module 228-2 may be generally operative to manage, control, process and otherwise perform security operations for the digital telephone 110. Examples of security operations may include without limitation encrypting or decrypting information, managing access to the digital telephone 110 by an operator, placing the digital telephone 110 in various operational modes such as locked or unlocked, and so forth.

In one embodiment, the telephone security module 228-2 may receive encrypted security credentials from the computing device 102. The telephone security module 228-2 receives the encrypted security credentials over the communications media 106, which in some implementations may comprise a wired communications media such as a Universal Serial Bus (USB) cable or IEEE 1394 FireWire cable. The telephone security module 228-2 may decrypt the encrypted security credentials utilizing a decryption technique corresponding to the encryption technique utilized by the provisioning and control subsystem 108, and with the PIN received from the operator. This forms a set of decrypted security credentials that can be used for authentication purposes.

The telephone authentication module 228-3 may be communicatively coupled to the telephone security module 228-2. The telephone authentication module 228-3 may be generally operative to manage, control, process and otherwise perform authentication operations for the digital telephone 110. In one embodiment, for example, the digital telephone management subsystem 200 may implement authentication operations in accordance with a VoIP signaling protocol such as the SIP standard, which in part utilizes the authentication techniques defined by the IETF Hypertext Transport Protocol (HTTP) series of standards. The particular authentication operations implemented by the digital telephone management subsystem 200, however, may vary in accordance with the particular set of VoIP or unified communications protocols desired for a given UC system. The embodiments are not limited in this case.

In one embodiment, the telephone authentication module 228-3 may authenticate the digital telephone 110 using the decrypted security credentials. The type and sequencing of authentication operations may vary depending on the type of security credentials utilized for a given level of security.

In some cases, the encrypted security credentials may include all the security information needed to complete authentication operations with the communications server 112. In one embodiment, for example, the security credentials may comprise a domain user name, a password and a domain name. The telephone authentication module 228-3 may be operative to send a registration request with the domain user name, the password and domain name decrypted from the encrypted security credentials to the communications server 112. The communications server 112 may register the digital telephone 110 utilizing the security credentials, and send back a message indicating the registration and authentication operations have been successfully or unsuccessfully completed.

In other cases, the encrypted security credentials may include only a portion of the security information needed to complete authentication operations with the communications server 112. In such cases, the remaining portion of the needed security information may be provided by the computing device 102 via a relay circuit provided by the digital telephone 110.

In one embodiment, for example, the security credentials may include a domain user name and a domain name, but not the password. The telephone authentication module 228-3 may be operative to send a registration request with a domain user name and domain name decrypted from the encrypted security credentials to the communications server 112. When the communications server 112 realizes the need for additional security information, the communications server 112 may send an authentication request to the digital telephone 110. The authentication request may comprise a server challenge for a password.

The telephone authentication module 228-3 may operate as a proxy or relay and send the authentication request from the communications server 112 to the computing device 102. The computing device 102 may receive the authentication request from the digital telephone 110, and send an authentication response with the password. The telephone authentication module 228-3 may receive the authentication response, and forward it with the password from the computing device 102 to the communications server 112 to complete authentication operations for the digital telephone 110. The communications server 112 may register the digital telephone 110 utilizing the security credentials, and send back a message indicating the registration and authentication operations have been successfully or unsuccessfully completed.

In addition to managing authentication operations, the digital telephone management subsystem 200 may manage certain operational states for the digital telephone 110 and/or the computing device 102. In one embodiment, the telephone security module 228-2 of the digital telephone management subsystem 200 may receive and process explicit control directives from the provisioning and control subsystem 108. The telephone security module 228-2 may control certain operations for the digital telephone 110 according to the received control directives. For example, the computing device 102 may place the digital telephone 110 in a locked state or unlocked state.

In some cases, a given operational state for the digital telephone 110 may mimic or correspond to a locked state or unlocked states for the computing device 102. For example, when an operator provides a command to unlock the computing device 102, and the digital telephone 110 is communicatively coupled to the computing device 102, the computing device 102 may unlock itself and automatically send a control directive to the digital telephone 110 to enter an unlocked operational state as well. This has the advantage of avoiding the need for an operator to manually unlock both devices. Additionally or alternatively, the telephone security module 228-2 of the digital telephone 110 may monitor the computing device 102 to detect any changes to an operational state for the computing device 102, and modify its own operational state accordingly. This reduces or eliminates the need for the computing device 102 to send an explicit control directive to the digital telephone 110.

The telephone security module 228-2 may also send explicit control directives to the provisioning and control subsystem 108 of the computing device 102. In such cases, the provisioning and control subsystem 108 can receive and process the control directives to control certain operations for the computing device 102. For example, the digital telephone 110 may place the computing device 102 in a locked state or unlocked state, in some cases corresponding to a locked state or unlocked states for the digital telephone 110. The computing device 102 can also monitor the digital telephone 110 to detect any changes to an operational state for the digital telephone 110, and modify its own operational state accordingly.

In addition to utilizing explicit control directives to modify the operational states for the computing device 102 and/or the digital telephone 110, the provisioning and control subsystem 108 and the telephone security module 228-2 may modify their respective operational states based on implicit or derived information. In one embodiment, for example, the telephone security module 228-2 can determine whether to lock or unlock the digital telephone 110 based on presence information for the computing device 102.

In computer and telecommunications networks, presence information is used to convey ability and willingness of a potential communication partner to communicate. The communication partner typically provides presence state information via a network connection to a presence service. The presence service publishes the presence state information to a set of watchers, who can then determine whether the communication partner is available or willing to open a communication channel.

In some cases, the computing device 102 and/or the digital telephone 110 may comprise presentity nodes in the communications network 100. The term "presentity" may refer to an entity described by presence information. The entity may comprise, for example, a human user or operator of an electronic device. A presentity node may refer to an electronic device used by a presentity to convey presence state information to watcher nodes over a network, typically via a presence server. The watcher nodes may receive the published presence state information, and display the presence state information for other human users or operators sometimes referred to as watchers. The watchers may then determine whether a presentity is willing and/or able to communicate with another communication partner based on the presence state information.

A presentity node may publish presence state information to indicate its current communication status. This published presence state information informs others that desire to contact the presentity of his/her availability and willingness to communicate. A common use of presence state information is to display an indicator icon on a communication application, such as an instant messaging (IM) client. The indicator icon may comprise a graphic symbol corresponding with an easy-to-convey meaning, and a list of corresponding text descriptions for each of the states. Examples of such text descriptions may include "free for chat," "busy," "away," "do not disturb," "out to lunch" and so forth. Such presence states exist in many variations across different communications clients. Current standards typically support a rich choice of additional presence attributes that can be used for presence information, such as user mood, location, or free text status.

When implementing presence techniques, the computing device 102 and/or the digital telephone 110 may be implemented as presentity nodes utilizing a number of different communication channels. The concept of multiple communication devices combining presence state information to provide an aggregated view of a presentity's presence is typically referred to as a Multiple Points of Presence (MPOP) technique. From this perspective, the computing device 102 and/or the digital telephone 110 may be considered examples of MPOP devices. It may be appreciated that other electronic devices may be implemented as MPOP devices utilizing some or all of the embodiments described herein, and still fall within the intended scope of the embodiments.

Beyond convenience, MPOP allows automatic inferences drawn from passive observation of a presentity's actions. For example, instant messaging users can have their status set to "Away" (or equivalent) if their computer keyboard is inactive for some time. Extension to other devices could include whether the presentity's cell phone is on, whether they are logged into their computer, or perhaps checking their electronic calendar to see if they are in a meeting or on vacation. For example, if a presentity's calendar was marked as out of office and their cell phone was on, they might be considered in a "Roaming" state. MPOP status can then be used to automatically direct incoming messages across all contributing devices. For example "Out of office" might translate to a system directing all messages and calls to the presentity's cell phone. The status "Do not disturb" might automatically save all messages for later and send all phone calls to voicemail.

When the computing device 102 is implemented as a presentity node and publishes presence state information using a presence server, the digital telephone 110 may be implemented as a watcher node to watch for the presence state information. The digital telephone 110 may change its operational state based on the presence state information for the computing device 102. For example, when the computing device 102 sends presence state information indicating that it is willing and available to establish communication channels for communications sessions, the digital telephone 110 may detect the presence state information and assume the computing device 102 is in an unlocked operational state. The telephone security module 228-2 may then cause the digital telephone 110 to enter an unlocked operational state corresponding to the unlocked operational state of the computing device 102. The telephone security module 228-2 may perform similar operations to determine whether to enter a locked state based on presence state information for the computing device 102 indicating that the computing device 102 is unwilling or unable to communicate with other communications partners.

In some cases, the computing device 102 may also modify its operational state based on implicit or derived presence state information for the digital telephone 110. In such cases, the digital telephone 110 may operate as a presentity node, and the computing device 102 may operate as a watcher node. The computing device 102 may modify its operational states based on the current presence state information published for the digital telephone 110.

Figure 3:
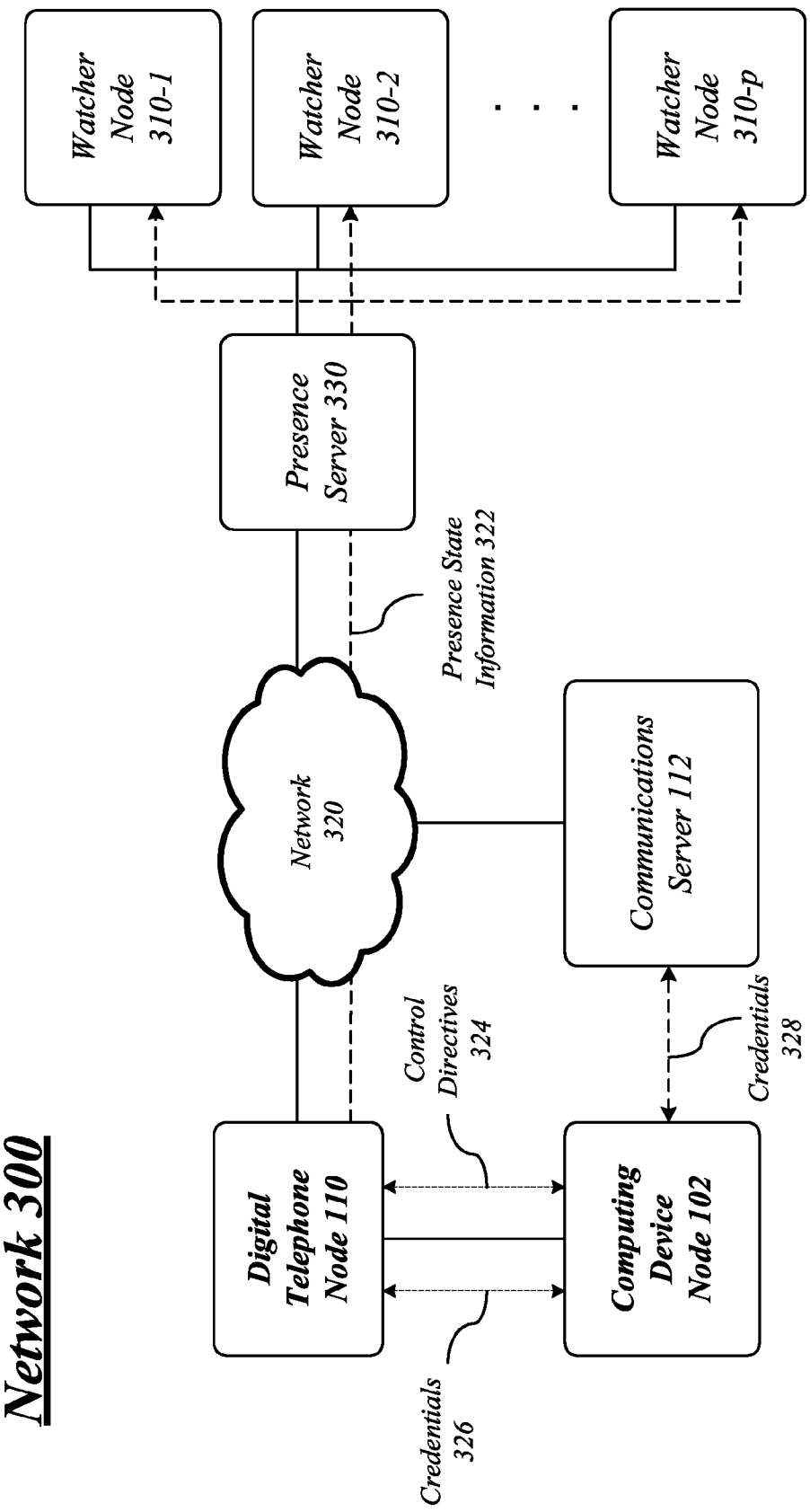
FIG. 3 illustrates an embodiment of a second network.

FIG. 3 illustrates a block diagram of a communications network 300. The communications network 300 is similar to the communications network 100, with some additional nodes. In addition to the network elements illustrated for the communications network 100 as described with reference to FIG. 1, the network 300 may further illustrate a network 320, a presence server 330, and various watcher nodes 310-1-*p*.

In the illustrated embodiment shown in FIG. 3, the digital telephone 110 may communicate with the computing device 102 to exchange security credentials 326 and control directives 324. The security credentials 326 may be used to support authentication operations for the digital telephone 110. The security credentials 326 may be partially or fully derived from security credentials 328 exchanged between the computing device 102 and the communications server 112, either directly or indirectly via the network 320. The network 320 may represent, for example, a packet-switched network, or a combination circuit-switched network and packet-switched network.

In addition to using the security credentials 326, 328 to support authentication operations, the telephone security module 228-2 and/or the provisioning and control subsystem 108 may utilize the control directives 324 to support security operations for the respective digital telephone 110 and/or the computing device 102. When either device operates as a presentity node, such as the computing device 102, it may send presence state information 322 to the presence server 330. The presence state information 322 may represent any number of defined presence states for a presentity. In a basic form, the presence state information 322 may include presence available state information and presence unavailable state information. The presence server 330 may publish the presence unavailable state information to the watchers nodes 310-1-*p*. The watcher nodes 310-1-*p* may display a text message such as "Presentity Available" or "Presentity Unavailable" when receiving presence state information 322 from the presence server 330. The digital telephone 110 may operate as one of the watcher nodes 310-1-*p*, and modify its operational state in accordance with the presence state information 322. Similar security operations may be performed by the computing device 102 when it acts as a watcher 310-1-*p*, and the digital telephone 110 operates as a presentity node.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
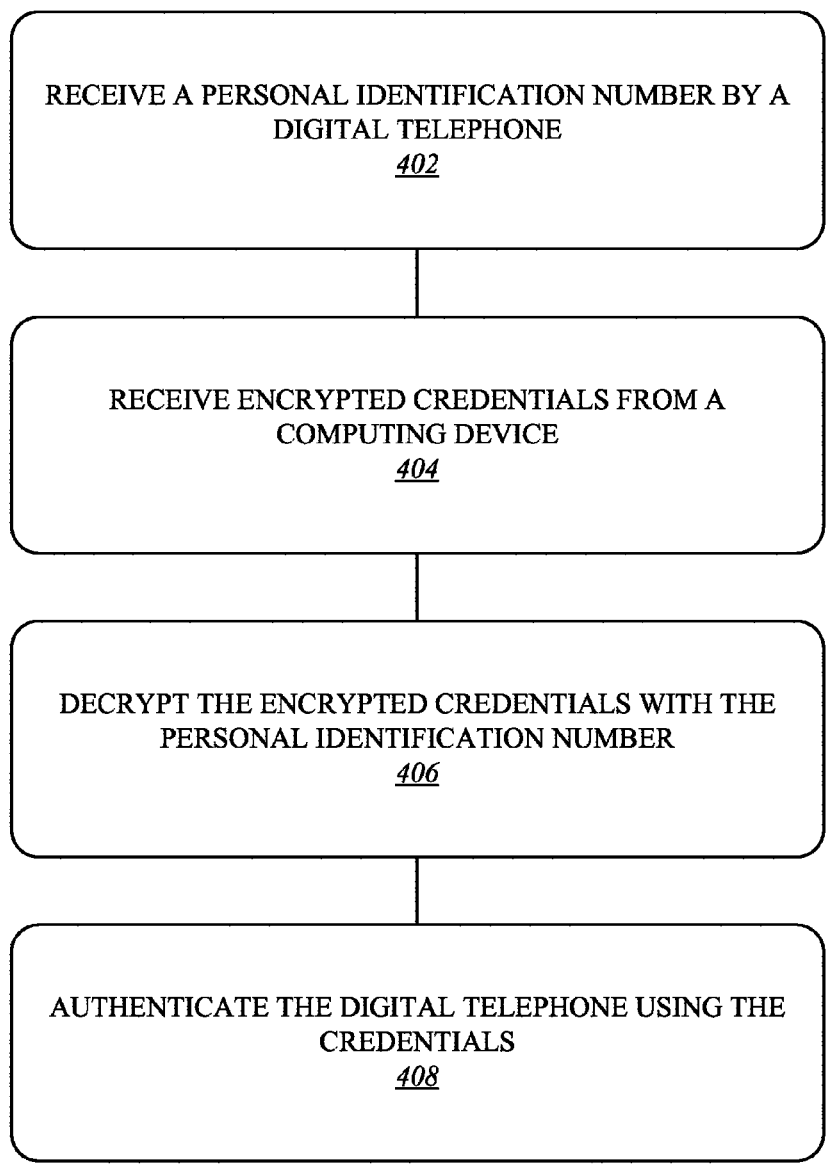
FIG. 4 illustrates an embodiment of a logic flow.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive a PIN by the digital telephone 110 at block 402. For example, the telephone interface module 228-1 may prompt an operator to enter a PIN using an input device for the digital telephone 110, and receive the PIN from the operator. The same PIN may be entered into the provisioning and control subsystem 108 for the computing device 102 to ensure a trusted relationship between the two devices.

The logic flow 400 may receive encrypted security credentials from a computing device at block 404. For example, the provisioning and control subsystem 108 may obtain security credentials for the digital telephone 110 from the communications server 112. In some cases, the security credentials may be the same for both the computing device 102 and the digital telephone 110, thereby reducing or avoiding the need for managing separate security credentials for both devices. The provisioning and control subsystem 108 may encrypt the security credentials using a PIN (or other symmetric security information), and forward the encrypted security credentials to the digital telephone 110. The provisioning and control subsystem 108 may forward the encrypted security credentials in response to a request from the digital telephone 110, automatically at a predetermined time, automatically in response to an event, or some other external stimulus. In any case, the telephone interface module 228-1 may receive the encrypted security credentials from the computing device 102.

The logic flow 400 may decrypt the encrypted security credentials with the PIN at block 406. For example, the telephone security module 228-2 may decrypt the encrypted security credentials with the PIN (or other symmetric security information) to yield at least a domain user name and a domain name. In one embodiment, the telephone security module 228-2 may further decrypt some additional form of security information, such as a password, from the encrypted security credentials.

The logic flow 400 may authenticate the digital telephone using the security credentials at block 408. For example, the telephone authentication module 228-3 may use the decrypted security credentials to authenticate the digital telephone 110 with the communications server 112. When the decrypted security credentials include a domain user name, a password and a domain name, the telephone authentication module 228-3 may completely authenticate the digital telephone with the communications server without any further security information. When the decrypted security credentials include a domain user name and a domain name, but omits a password, the password may be communicated from the computing device 102 on behalf of the digital telephone 110 to the communications server 112. This may be accomplished a number of different ways, such as using the digital telephone 110 as a relay circuit between the computing device 102 and the communications server 112, using a separate control channel established directly between the computing device 102 and the communications server 112 (e.g., via the network 320), and so forth.

Figure 5:
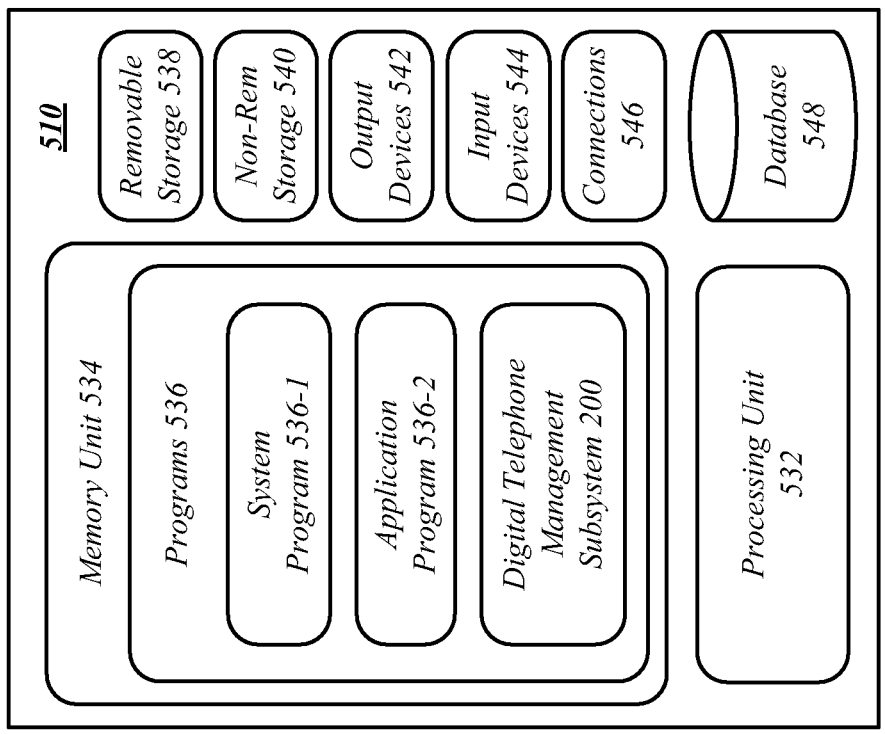
FIG. 5 illustrates an embodiment of a computing architecture.

FIG. 5 further illustrates a more detailed block diagram of computing architecture 510 suitable for implementing the digital telephone 110. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-t and accompanying data. Depending on the implementation, examples of software programs 536-1-t may include a system program 536-1 (e.g., an operating system), an application program 536-2 (e.g., a web browser), the provisioning and control subsystem 108, the digital telephone management subsystem 200, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-v. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

FIG. 6 illustrates a diagram an article of manufacture 600 suitable for storing logic for the various embodiments. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

FIG. 7 illustrates one embodiment of a message flow diagram 700. The message flow diagram 700 may be representative of an exemplary message flow between the various modules of the digital telephone management subsystem 200, the computing device 102 and the communications server 112. In the illustrated embodiment shown in FIG. 7, the telephone interface module 228-1 may determine that the digital telephone 110 is connected to the computing device 102 as indicated by arrow 702. The telephone security module 228-2 may query the telephone interface module 228-1 for a connection state for the digital telephone 110 as indicated by arrow 704. The telephone interface module 228-1 may respond that the connection state indicates a connection between the digital telephone 110 and the computing device 102 as indicated by arrow 706. The telephone security module 228-2 may next query if the provisioning and control subsystem 108 for the computing device 102 is currently running as indicated by arrow 708. The telephone interface module 228-1 may query the computing device 102 to determine whether provisioning and control subsystem 108 is running, and if so, receive an acknowledgement from the computing system 102, as indicated by arrows 710, 712. The telephone interface module 228-1 informs the telephone security module 228-2 that the provisioning and control subsystem 108 is running as indicated by arrow 714.

Once a connection with the computing device 102 is verified and the provisioning and control subsystem 108 is executing, the telephone security module 228-2 may prompt the telephone interface module 228-1 to retrieve the security credentials 326 as indicated by arrow 716. The telephone interface module 228-1 in turn prompts the provisioning and control subsystem 108 for the security credential the security credentials 326. At this point, the operator may enter a PIN (or other symmetric security information) into both the digital telephone 110 and the computing device 102 as indicated by arrows 720, 722. The provisioning and control subsystem 108 sends the security credentials 326 to the telephone interface module 228-1 as indicated by arrow 724, which is passed on to the telephone security module 228-2 as indicated by arrow 726. The security credentials 326 may comprise, for example, a domain user name, a password and a domain name encrypted with the PIN. The telephone security module 228-2 may decrypt the encrypted security credentials 326 to retrieve the domain user name, the password and the domain name as indicated by arrow 728. The telephone authentication module 228-3 may use the security credentials 326 to sign-in and authenticate the digital telephone 110 with the communications server 112 as indicated by arrows 730, 732. The telephone security module 228-2 may then encrypt and cache the security credentials 326 in one or both of the data stores 232, 234 of the storage component 230.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:

receiving a personal identification number by a digital telephone comprising a microphone;

receiving encrypted security credentials from a first computing device, the digital telephone and the first computing device comprising a trusted pair;

decrypting the encrypted security credentials with the personal identification number;

transmitting the decrypted security credentials to a communications server at a second computing device, the decrypted security credentials comprising security information;

receiving an authentication request by the digital telephone from the communications server, the authentication request requesting for a remaining portion of the security information;

transmitting the authentication request from the digital telephone to the first computing device;

receiving the remaining portion of the security information by the digital telephone from the first computing device;

transmitting the remaining portion of the security information of the digital telephone to the communications server at the second computing device; and completing authentication of the digital telephone with the communications server at the second computing device using the remaining portion of the security information.

2. The method of claim 1, comprising storing the encrypted security credentials at the digital telephone for subsequent authentication requests from the communications server.

3. The method of claim 1, comprising decrypting a domain user name, password, and domain name from the encrypted security credentials with the personal identification number.

4. The method of claim 1, comprising sending a registration request with a domain user name, a password and domain name decrypted from the encrypted security credentials to the communications server.

5. The method of claim 1, comprising decrypting a domain user name and domain name from the encrypted security credentials with the personal identification number.

6. The method of claim 1, comprising sending a registration request with a domain user name and domain name decrypted from the encrypted security credentials to the communications server.

7. The method of claim 1, comprising relaying an authentication request from the communications server to the first computing device, and a password from the first computing device to the communications server to authenticate the digital telephone.

8. The method of claim 1, comprising receiving control directives to lock or unlock the digital telephone from the first computing device.

9. The method of claim 1, comprising sending control directives to lock or unlock the first computing device from the digital telephone.

10. The method of claim 1, comprising determining to lock or unlock the digital telephone based on presence information for the first computing device.

11. An article of manufacture comprising a storage device containing instructions that if executed enable a system to:
receive a personal identification number by a digital telephone comprising a microphone;
receive encrypted security credentials from a first computing device, the digital telephone and the first computing device comprising a trusted pair;
decrypt the encrypted security credentials with the personal identification number;
transmit the decrypted security credentials to a communications server at a second computing device, the decrypted security credentials comprising security information;
receive an authentication request by the digital telephone from the communications server, the authentication request requesting for a remaining portion of the security information, the remaining portion of the security information comprising a password;
transmit the authentication request from the digital telephone to the first computing device;
receive the remaining portion of the security information by the digital telephone from the first computing device;
transmit the remaining portion of the security information of the digital telephone to the communications server at the second computing device; and
complete authentication of the digital telephone with the communications server at the second computing device using the remaining portion of the security information.

12. The article of manufacture of claim 11, further comprising instructions that if executed enable the system to send a registration request with a domain user name, a password and domain name decrypted from the encrypted security credentials to the communications server.

13. The article of manufacture of claim 11, further comprising instructions that if executed enable the system to receive control directives to lock or unlock the digital telephone from the first computing device.

14. The article of manufacture of claim 11, further comprising instructions that if executed enable the system to send control directives to lock or unlock the first computing device from the digital telephone.

15. The article of manufacture of claim 11, further comprising instructions that if executed enable the system to determine to lock or unlock the digital telephone based on presence information for the first computing device.

16. An apparatus, comprising:
a digital telephone management component operative to manage a digital telephone, the digital telephone comprising a microphone, the digital telephone management component comprising:
a telephone interface module operative to receive a personal identification number by the digital telephone;
a telephone security module communicatively coupled to the telephone interface module, the telephone security module operative to receive encrypted security credentials from a first computing device, and decrypt the encrypted security credentials with the personal identification number, the encrypted security credentials comprising a first portion of security information, the digital telephone and the first computing device comprising a trusted pair; and
a telephone authentication module communicatively coupled to the telephone security module, the telephone authentication module operative to provide a relay circuit between the first computing device and a communications server at a second computing device to transmit the first portion of the security information and a second portion of the security information and authenticate the digital telephone with the communications server at the second computing device using the first portion of the security information and the second portion of the security information.

17. The apparatus of claim 16, the telephone authentication module operative to send a registration request with a domain user name, a password and domain name decrypted from the encrypted security credentials to the communications server.

18. The apparatus of claim 16, the telephone authentication module operative to send a registration request with a domain user name and domain name decrypted from the encrypted security credentials to the communications server.

19. The apparatus of claim 16, the telephone authentication module operative to relay an authentication request from the communications server to the first computing device, and a password from the first computing device to the communications server to authenticate the digital telephone.

20. The apparatus of claim 16, comprising a storage component communicatively coupled to the digital telephone management component, the storage component operative to store the encrypted security credentials for subsequent authentication requests from the communications server.

* * * * *